United States Patent [19]

Ogata et al.

[11] Patent Number: 4,602,300

[45] Date of Patent: Jul. 22, 1986

[54] ADAPTER FOR A MINIATURE TYPE TAPE CASSETTE

[75] Inventors: Haruki Ogata, Sagamihara; Kimio Ogawa; Hiroyuki Umeda, both of Yokohama, all of Japan

[73] Assignee: Victor Company of Japan, Ltd., Yokohama, Japan

[21] Appl. No.: 645,515

[22] Filed: Aug. 27, 1984

Related U.S. Application Data

[63] Continuation of Ser. No. 340,097, Jan. 18, 1982, abandoned.

[30] Foreign Application Priority Data

Jan. 20, 1981 [JP] Japan .................................. 56-7566

[51] Int. Cl.$^4$ .................... G11B 15/04; G11B 19/04; G11B 5/008; G11B 15/00
[52] U.S. Cl. ........................ 360/60; 360/94; 360/96.5
[58] Field of Search ............. 360/60, 85, 94, 96.5, 360/132

[56] References Cited

U.S. PATENT DOCUMENTS

| | | | |
|---|---|---|---|
| 3,632,894 | 1/1972 | Bretschneider et al. | 360/94 |
| 3,689,077 | 9/1972 | Ohira | 360/60 |
| 4,432,510 | 2/1984 | Ogata et al. | 360/94 |
| 4,470,560 | 9/1984 | Yoneya et al. | 360/94 |
| 4,476,505 | 10/1984 | Ogata et al. | 360/94 |
| 4,477,850 | 10/1984 | Ogata et al. | 360/94 |
| 4,494,161 | 1/1985 | Ogata et al. | 360/94 |

FOREIGN PATENT DOCUMENTS

| | | | |
|---|---|---|---|
| 7232195 | 2/1974 | Fed. Rep. of Germany | 360/94 |
| 2242808 | 3/1974 | Fed. Rep. of Germany | 360/94 |
| 2004238 | 11/1969 | France | 360/94 |
| 45-30293 | 10/1970 | Japan | 360/94 |
| 52-33513 | 3/1977 | Japan | 360/60 |
| 55-45172 | 3/1980 | Japan | 360/94 |
| 56-119965 | 9/1981 | Japan | 360/94 |
| 58-143474 | 8/1983 | Japan | 360/96.5 |
| 1248289 | 9/1971 | United Kingdom | 360/94 |
| 1289153 | 9/1972 | United Kingdom | 360/94 |

Primary Examiner—A. J. Heinz
Assistant Examiner—Alfonso Garcia
Attorney, Agent, or Firm—Louis Bernat

[57] ABSTRACT

An adapter for a miniature type tape cassette has an external form and size smaller than those of a standard type tape cassette. The miniature type tape cassette is primarily designed for a recording and/or reproducing apparatus of a type different from a standard type recording and/or reproducing apparatus which is originally designed for the standard type tape cassette. The miniature type tape cassette has an erroneous erasure preventing tab which operates together with a detection mechanism of the recording and/or reproducing apparatus of the different type. While the standard type recording and/or reproducing apparatus has a detection mechanism which is primarily designed to operate together with an erroneous erasure preventing tab of the standard type tape cassette. The adapter comprises an adapter case having an external form and size substantially equal to those of the standard type tape cassette, an accommodating part for accommodating the miniature type tape cassette, and an erroneous erasure preventing mechanism provided within the adapter case. The erroneous erasure preventing mechanism has a tab part which moves at a position capable of operating together with the detection mechanism of the standard type recording and/or reproducing apparatus in response to the existence and non-existence of the erroneous erasure preventing tab of the miniature type tape cassette accommodated within the accommodating part.

7 Claims, 21 Drawing Figures

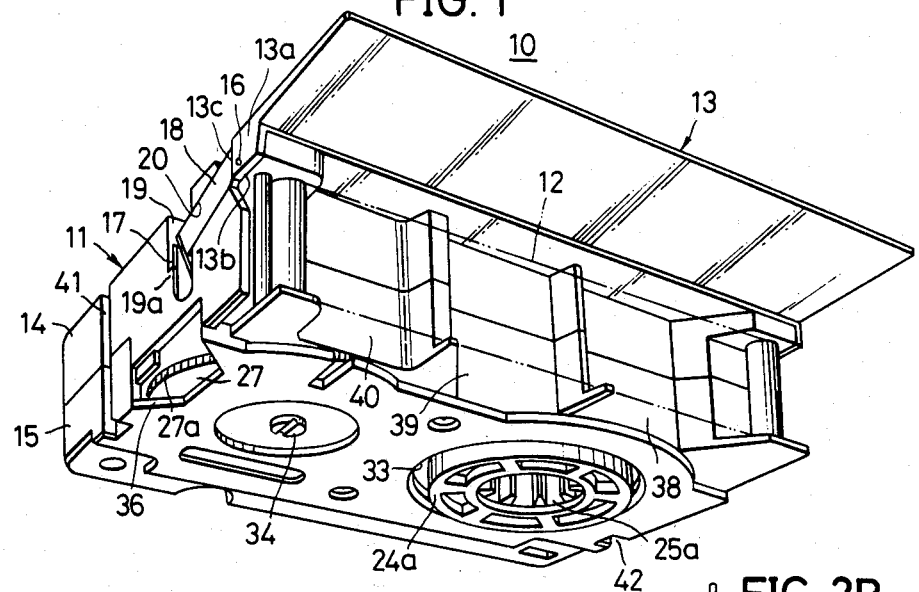
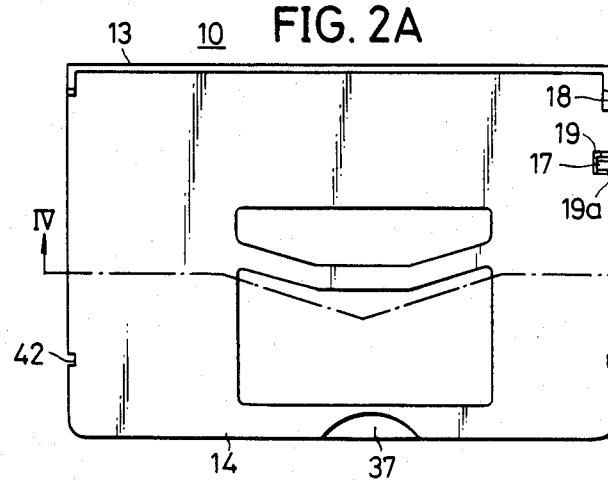
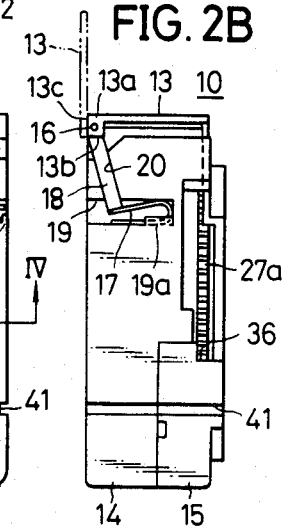
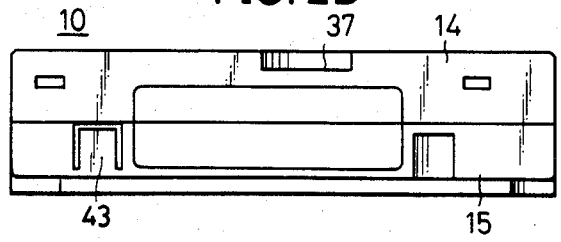

ADAPTER FOR A MINIATURE TYPE TAPE CASSETTE

This is a continuation of U.S. application Ser. No. 340,097, filed Jan. 18, 1982, now abandoned, and entitled "ADAPTED FOR A MINIATURE TYPE TAPE CASSETTE."

BACKGROUND OF THE INVENTION

The present invention generally relates to adapters having an external form and size equal to those of a standard type tape cassette to be used with a standard type recording and/or reproducing apparatus, which is loaded into the standard type recording and/or reproducing apparatus in a state accommodating a miniature type tape cassette which is smaller than the standard type tape cassette to form a predetermined tape path within the adapter by drawing a tape out of a cassette case, and is primarily designed to be loaded independently into a recording and/or reproducing apparatus of a type different from the standard type recording and/or reproducing apparatus. And more particularly, the present invention relates to an adapter provided with an erroneous erasure preventing mechanism which operates together with a detection mechanism for detecting the existence or non-existence of an erroneous erasing preventing tab with respect to the standard type tape cassette in the standard type recording and/or reproducing apparatus, according to the existence or non-existence of an erroneous erasing preventing tab of the miniature type tape cassette accommodated within the adapter.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist worldwidely. There is no interchangeability between apparatuses of different standards, however, th interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in reducing the size of the recording and/or reproducing apparatus main body. This is to develop a more compact portable type recording and/or reproducing apparatus, and, for example, to realize such an equipment that a recording apparatus is unitarily built into a television camera.

In this regard, some attempts have been made to develop a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, such compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is a limiting factor which is kept equal to the distance between the supply side and take-up side reels of the standard type tape cassette, so that the tape cassette used for the portable recording and/or reproducing apparatus can be loaded into the standard type recording and/or reproducing apparatus. On the other hand, even when the tape quantity is reduced in order to reduce the diameter of the reels, there is a limit of practicality in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. In this regard, it is also exceedingly difficult to construct the above mechanism for pulling out the tape, so as to ensure the interchangeability with respect to the above compact or miniature type tape cassette and the standard type tape cassette. Practically the realization of such a mechanism is virtually impossible.

SUMMARY OF THE INVENTION

Accordingly, it is a general object of the present invention to provide a novel and useful adapter for a miniature type tape cassette which enables the miniature type tape cassette to be loaded into a standard type recording and/or reproducing apparatus, and in which the above described disadvantages have been overcome.

Another and more specific object of the present invention is to provide an adapter having an external form and size equal to those of a standard type tape cassette designed for a standard type recording and/or reproducing apparatus. The adapter is loaded into the standard type recording and/or reproducing apparatus in a state accommodating a miniature type tape cassette which is smaller than the standard type tape cassette and is designed to be loaded independently into a recording and/or reproducing apparatus of a type different from the standard type recording and/or reproducing apparatus. The adapter is provided with an erroneous erasure preventing tab mechanism which operates together with a detection mechanism for detecting the existence or non-existence of an erroneous erasing preventing tab with respect to the standard type tape cassette in the standard type recording and/or reproducing apparatus, according to the existence or non-existence of an erroneous erasure preventing tab of the above miniature type tape cassette. According to the adapter of the present invention, the standard type recording and/or producing apparatus can indirectly detect the existence or non-existence of the erroneous erasure preventing tab with respect to the miniature type tape cassette, and the erroneous erasure preventing operation can be performed positively.

Other objects and further features of the present invention will be apparent from the following detailed description when read in conjunction with the accompanying drawings.

BRIEF DESCRIPTION OF THE DRAWINGS

FIG. 1 is a perspective view showing an example of a miniature type tape cassette which is to be accommodated within an adapter for a miniature type tape cassette according to the present invention, in a state where a tape protecting lid is open, viewed from a lower direction with respect to the front of the miniature type tape cassette;

FIGS. 2A, 2B, 2C, and 2D respectively show a plan view, a side view, a bottom view, and a rear view of the tape cassette shown in FIG. 1;

DETAILED DESCRIPTION

Figure 2C:
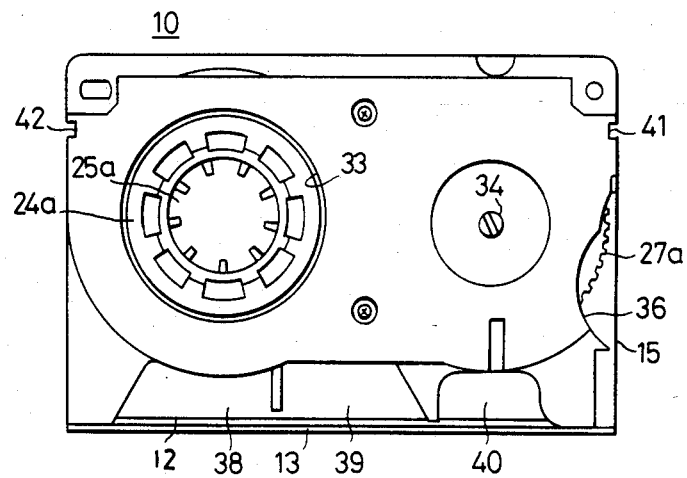

First, description will be given with respect to a miniature type tape cassette which can be applied to an adapter for a miniature type tape cassette according to the present invention.

A miniature type tape cassette 10 is shown in FIGS. 1, 2A through 2D, 3, and 4. The tape cassette 10 has a cassette case 11 of a size smaller than a standard type tape cassette which is primarily designed for a standard type recording and/or reproducing apparatus. A lid 13 for protecting a magnetic tape 12 accommodated within the tape cassette 10, is provided on the front of the cassette case 11. The cassette case 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14, in a state where th leaf spring 17 is held by a projecting rib 19a and does not easily detach from the side groove 19. The slide rod 18 is provided within a groove 20 at the side of the upper half 14, in a freely slidable manner. Moreover, when the tape cassette 10 is not loaded into a recording and/or reproducing apparat designed exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

Figure 3:
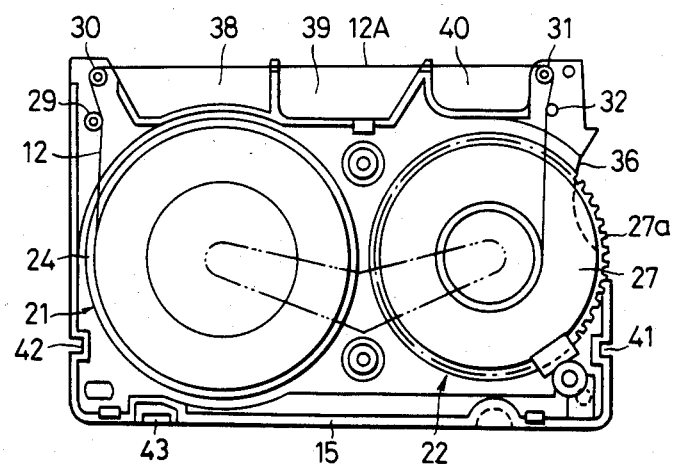
FIG. 3 is a plan view showing the inner construction of the tape cassette shown in FIG. 1 in a state where an upper half of a cassette case and an upper flange of a reel are removed.
Figure 4:
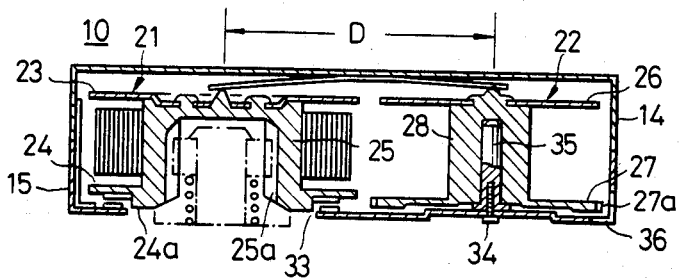
FIG. 4 shows a cross section taken along a line IV—IV in FIG. 2A.
Figure 5:
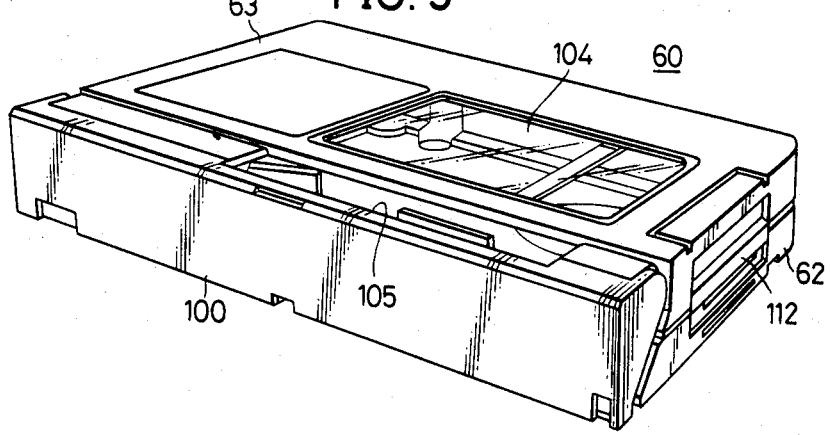
FIGS. 5 and 6 are a perspective view and a rear view respectively showing an embodiment of an adapter for a miniature type tape cassette according to the present invention.
Figure 6:
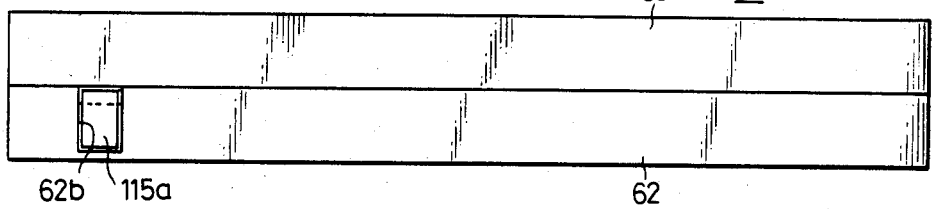

In addition, as shown in FIGS. 3 and 4, a supply side reel (supply reel) 21 and a take-up side reel (take-up reel) 22 are provided side by side within the cassette case 11. A distance D between centers of the reels 21 and 22 is shorter than the distance between centers of supply and take-up reels of a standard type tape cassette designed for a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right sides, along the front portion of the cassette case 11, to form a tape path 12A reaching the take-up reel 22.

The supply reel 21 is provided in a state where an annular projecting step portion 24a of the lower flange 24 is loosely fitted into a hole 33 having a large diameter on the lower half 15.

The take-up reel 22 is provided in a rotatable manner in such a way that a fixed shaft 35 mounted on the lower half 15 by a screw 34 is inserted into a center hole of the reel hub 28.

In addition, gear teeth 27a are formed on the entire peripheral of the lower flange 27 of the take-up reel 22. As shown in FIGS. 1, 2B, 2C, 3, and 4, a part of the peripheral of the lower flange 27 is exposed through a cutout window 36 which extends from the side to the bottom of the lower half 15.

In addition, a substantially semi-circular depressed step part 37 in the plan view, is formed at a central top part of the tape cassette 10 extending to the rear side. This depressed step part 37 engages with an engaging lever provided on the tape cassette adapter, as will be described hereinafter.

Figure 2E:
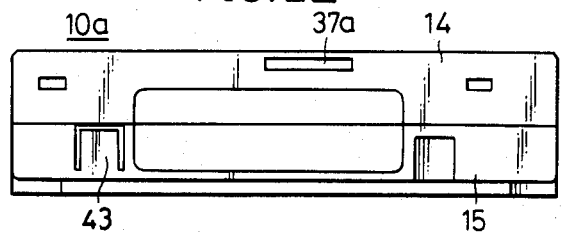
FIG. 2E is a rear view showing a modification of the tape cassette shown in FIG. 1.

FIG. 2E sho a miniature type tape cassette 10a which is a modification of the above described miniature type tape cassette. The tape cassette 10a has a depression 37a on the rear side at a position near the upper surface thereof, instead of the depressed step part 37. This depression 37a is of a substantially semi-circular shape in the direction of the cassette width, similarly as in the case of the above depressed step part 37, and engages with the engaging lever provided on the tape cassette adapter. Hence, the above miniature type tape cassette 10a does not have any step at the upper surface thereof, since the depression 37a is used instead of the depressed step part 37.

The above miniature type tape cassette 10 (10a) has cutouts 38, 39, and 40 at the front side thereof, and grooves 41 and 42 at the right and left side walls thereof. Further, an erroneous erasure preventing tab 43 is provided at the rear side of the tape cassette 10 (10a).

Next, description will be given with respect to an adapter for a miniature type tape cassette according to the present invention which is loaded into the standard type recording and/or reproducing apparatus in a state accommodating the tape cassette 10 having the above described construction, by referring to FIGS. 5 through 12.

A tape cassette adapter 60 for a miniature type tape cassette has an accommodating part 61 for accommodating the above tape casstte 10, and has an external form and size substantially equal to those of the standard type tape cassette.

The adapter 60 consists of a lower half 62 and an upper half 63, and these halves 62 and 63 are connected at the sides thereof by a hinge 64. The upper half 63 can pivot between an open position indicated in FIG. 7, and a closed position indicated in FIGS. 5, 6, and 9 where the upper half 63 covers the lower half 62.

The above accommodating part 61 for accommodating the tape cassette 10 is formed at a predetermined position of the lower half 62. A rotation transmitting mechanism 65 is provided at a position adjacent to the accommodating part 61. When the lower half 62 is placed on top of the standard type tape cassette for comparison, the supply reel 21 of the tape cassette 10 accommodated within the accommodating part 61 is arranged at a position corresponding to the position of the supply reel of the standard type tape cassette. In addition, a gear structure 66 of the rotation transmitting mechanism 65 is arranged at a position corresponding to the position of the take-up reel of the standard type tape cassette.

The accommodating part 61 has a shape substantially identical to the outline of the tape cassette 10 in the plan view, and is a space surrounded by right and left side walls 68 and 67 and a rear wall 69 respectively opposing the right and left sides and the rear of the tape cassette 10 accommodated within the accommodating part 61 and a bottom plate 70 opposing the bottom of the tape cassette 10. A circular hole 72 is provided on the bottom plate 70 at a position corresponding to the position of the supply reel of the tape cassette 10 which is accommodated. In addition, a cylindrical member 73 is provided on the bottom plate 70 at a position corresponding to the position of the take-up reel of the tape cassette 10 which is accommodated.

Figure 11:
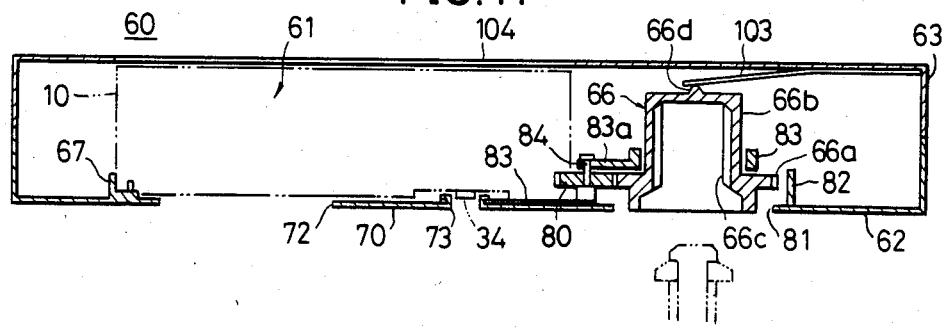
FIG. 11 shows a vertical cross section of the adapter shown in FIG. 5.

The rotation transmitting mechanism 65 consists of the gear structure 66 and an intermediate gear 80 having a small diameter which meshes with the above gear structure 66. As shown in FIG. 11, the gear structure 66 has a gear 66a at the flange part, and a reel driving shaft inserting part 66c within a central projecting part 66b. The gear structure 66 is arranged in a rotatable manner opposing a hole 81 at the bottom of the lower half 62. The above gear structure 66 is maintained at a predetermined position in a state where the gear structure 66 is free to move to a certain extent, within an arcuate wall 82 which is provided on the lower half 62.

The intermediate gear 80 is axially supported by a shaft 84 which links tip ends of an arm 87 supported by the cylindrical member 73 and an arm 86 supported by a support shaft 85.

A ring-shaped holder 83 is fitted over the periphery of the central projecting part 66b of the gear structure 66 in a rotatable manner. The intermediate gear 80 is provided on the shaft 84 at the tip end of an arm part 83a of the holder 83.

Similarly as in the standard type tape cassette, cutouts 90 and 91 for inserting loading poles, and a cutout 92 and the like for inserting a capstan, are respectively provided in the front part of the lower half 62.

Furthermore, guide poles 93 and 94 are embeddedly provided at the end of the above cutout 90 and at the end of the cutout 92, respectively, in the lower half 62. As will be described hereinafter, the guide poles 93 and 94 guide the magnetic tape 12 so that the magnetic tape 12 forms a tape path 12B along the front of the adapter 60.

Moreover, a cutout 95 for inserting a lid opening lever, openings 96a and 96b for inserting positioning pins, an opening 97 for inserting a light emitting source for detecting the end of the magnetic tape 12, an opening 98 for inserting a reel brake releasing pin, and the like are provided in the lower half 62.

An opening and closing lid 100 is provided at the front of the upper half 63. The lid 100 is of a shape identical to the opening and closing lid of the standard type tape cassette. The lid 100 is supported at the right and left sides, and is constantly urged towards a lid closing direction by a spring 102 provided on a shaft 101.

In addition, a leaf spring 103 is mounted on the upper half 63, to make contact with and push against a central projection 66d of the gear structure 66 when the upper half 63 is closed. A transparent plate 104 is adhered onto a part of the upper half 63 which opposes the tape cassette accommodating part 61 when the upper half 63 is closed. Further, a rectangular opening 105 for receiving the lid 13 of the tape cassette 10, is formed in the upper half 63 between the transparent plate 104 and the lid 100.

Figure 8:
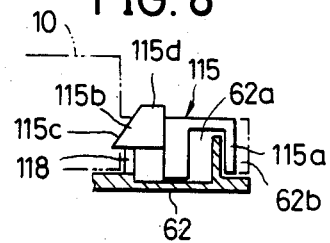
FIG. 8 is a cross section taken along a line VIII—VIII in FIG. 6, showing the shape of an erroneous erasure preventing tab.
Figure 9:
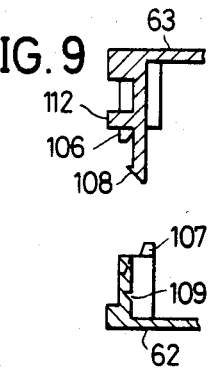
FIG. 9 is a cross section taken along a line IX—IX in FIG. 7, showing latch mechanisms of the upper and lower halves of the adapter in an opposing state.
Figure 7:
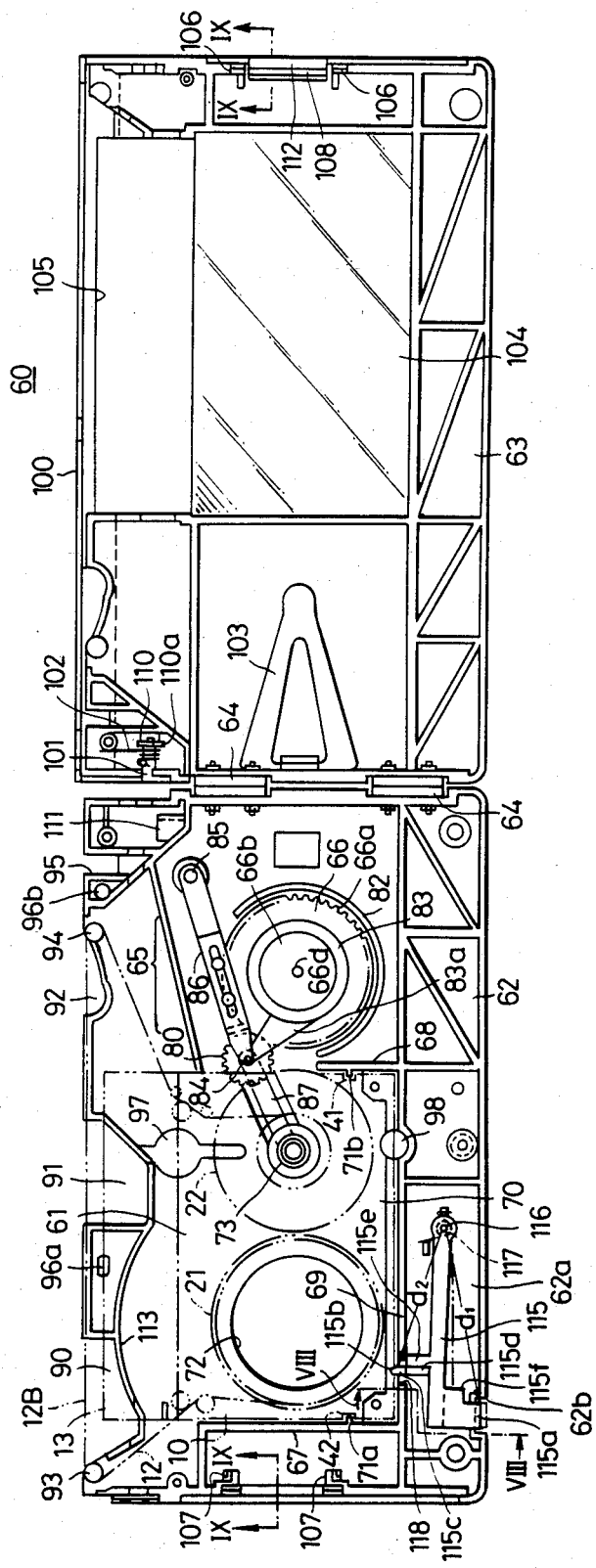
FIG. 7 is a plan view showing the adapter shown in FIG. 5 is a state where an upper half of the adapter is opened with respect to a lower half.

As shown in FIGS. 7 and 8, an erroneous erasure preventing lever 115 which constitutes an essential part of the present invention, is assembled within a space 62a at the rear of the tape cassette accommodating part 61 of the lower half 62. This lever 115 is axially supported by a projecting pin 116, and is urged to rotate clockwise by a coil spring 117. A tab 115a which is a downwardly bent part facing the rear of the adapter 60, and a detecting projection 115b facing to the inside of the accommodating part 61, are respectively provided at the tip end of the lever 115. The tab 115a enters within a depression 62b of the lower half 62, and is exposed at a position on the rear surface of the adapter 60 corresponding to the position of an erroneous erasure preventing tab of the standard type tape cassette. The detecting projection 115b passes through an opening 118 provided in the rear surface wall 69 of the adapter 60, and protrude into the accommodating part 61. Hence, the detecting projection 115b is at a position opposing the erroneous erasure preventing tab 43 of the tape cassette 10 accommodated within the accommodating part 61. The tip end of the detecting projection 115b is of a triangular shape and has a sloping surface 115c which slopes downwards. As will be described hereinafter, the above sloping surface 115c facilitates the accommodation of the tape cassette 10 into the accommodating part 61. Moreover, the detecting projection 115b has a vertex part 115d which is manipulated when the tape cassette 10 is removed from the accommodating part 61.

As described above, the erroneous erasure preventing lever 115 is a member made of synthetic resin or metal, unitarily having the tab 115a and the detecting projection 115b.

Next, description will be given with respect to the manipulation and operation involved in a case where the above described tape cassette 10 loaded into the standard type recording and/or reproducing apparatus.

In this case, the tape cassette 10 is accommodated within the adapter 60 to form the above described predetermined tape path within the adapter 60. This tape cassette adapter 60 accommodating the tape cassette 10 is loaded into the standard type recording and/or reproducing apparatus as in the case where the standard type tape cassette is loaded.

In order to accommodate the tape cassette 10 within the adapter 60, the lid 13 of the tape cassette 10 is first opened as shown in FIG. 1. Then, the magnetic tape 12 is drawn out from the tape cassette 10 by a predetermined length. In this state, the tape cassette 10 is pushed downwards and accommodated within the accommodating part 61, by fitting the grooves 41 and 42 provided at the sides of the tape cassette 10 with projecting ribs 71b and 71a of the adapter 60. After the tape cassette 10 is pushed downwards, the magnetic tape 12 is drawn out and threaded around the guide poles 93 and 94 so as to be guided by these guide poles 93 and 94. Accordingly, the magnetic tape 12 is guided by these guide poles 93 and 94, and forms the tape path 12B traversing the front of the cutouts 90, 91, and 92, as in the case of the standard type tape cassette.

Furthermore, the teeth 27a of the lower flange 27 in the take-up reel 22, exposed through the cutout window 36, meshes with the intermediate gear 80 as the tape cassette 10 is lowered.

Figure 12:
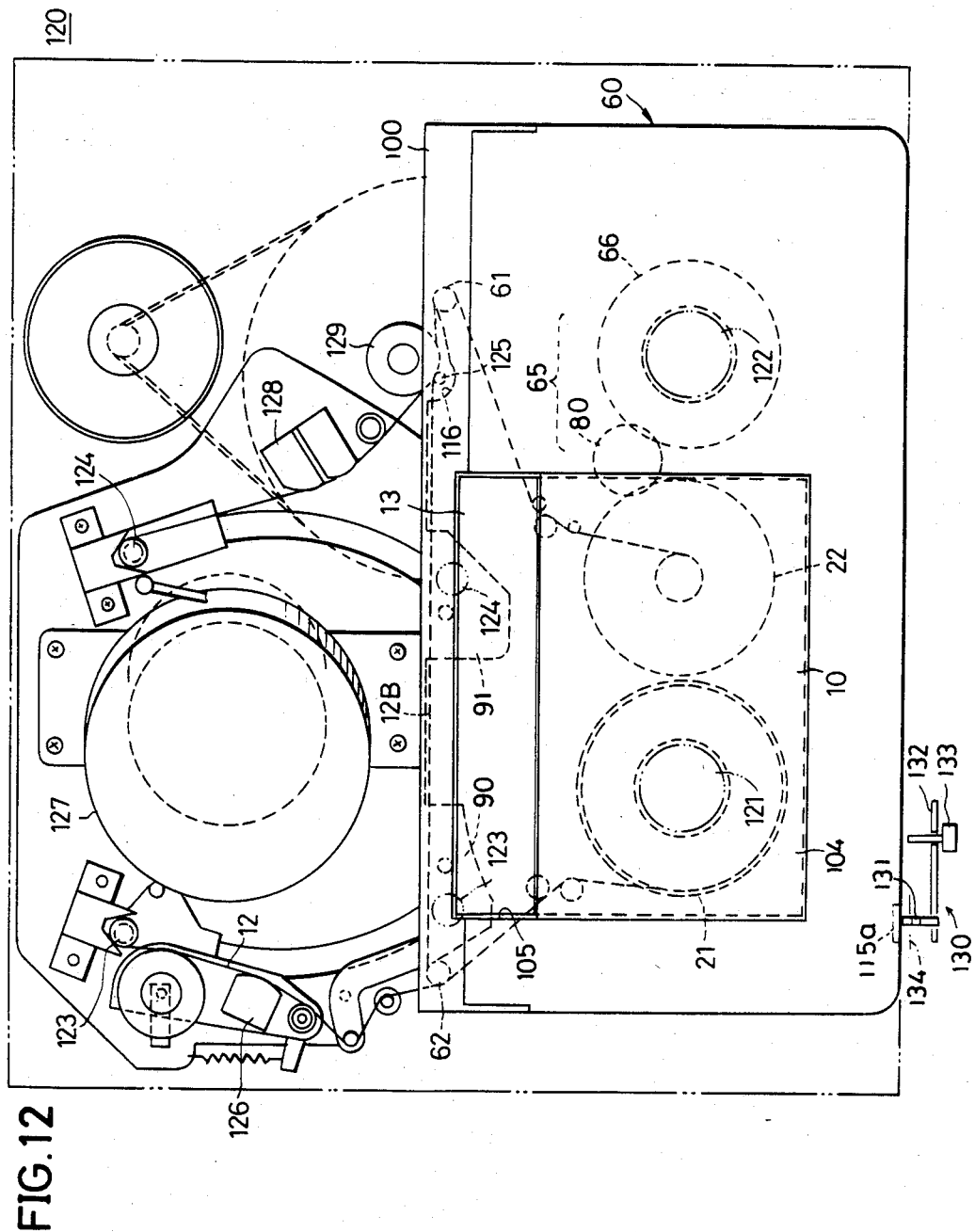
FIG. 12 is a plan view showing an example of a standard type recording and/or reproducing apparatus loaded with an adapter accommodating a miniature type tape cassette, during a recording or reproducing mode.

The upper half 63 is then rotated about the hinge 64 and closed. The upper half 63 is connected to the lower half 62 in this state where the upper half 63 covers the lower half 62. A clawed part 108 of the upper half 63 engages with a cutout groove 109 of the lower half 62, and the upper and lower halves 63 and 62 are locked in a state where guiding projections 106 and 107 of the upper and lower halves 63 and 62 make contact with each other to restrict positions of the upper and lower halves 63 and 62. Therefore, as shown in FIG. 12, the tape cassette adapter 60 is in a state where the tape cassette 10 is accommodated between the upper and lower halves 63 and 62 and the magnetic tape 12 drawn out from the tape cassette 10 is guided along the predetermined tape path 12B.

Figure 10:
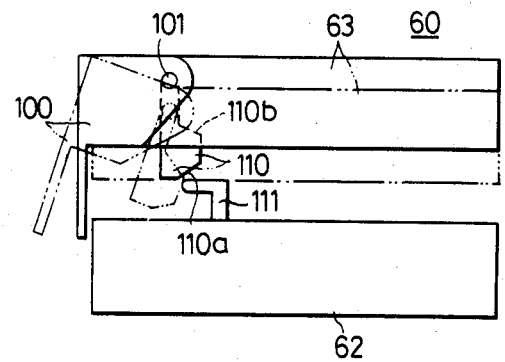
FIG. 10 is a side view showing a mechanism for temporarily opening a lid when the upper half of the adapter covers the lower half.

When the upper half 63 pivots from a position slightly before a final posiion unto the final position, sloping cam surfaces 110a and 110b of an arm 110 which is unitarily provided on the shaft 101 are guided by an L-shaped projection 111 provided on the lower half 62, as shown in FIG. 10. Thus, the lid 100 is once slightly opened as indicated by a two-dot chain line in FIG. 10 and departs from the magnetic tape 12 in the tape path 12B, and in a final stage, the lid 100 closes to cover the front surface of the tape cassette adapter 60. Therefore, when the upper half 63 is manipulated to cover the lower half 62, no inconveniences are introduced since the lid 100 does not hit the magnetic tape 12 in the tape path 12B to undesirably deform the magnetic tape 12. Further, the lock between the upper and lower halves 63 and 62 can be released by pushing a projection 112.

As shown in FIG. 11, the tape cassette 10 is accommodated within the accommodating part 61 of the adapter 60, in a state where the tape cassette 10 is positioned due to the head part of the screw 34 entering within the cylindrical member 73.

Next, description will be given with respect to the operation of the erroneous erasure preventing lever 115 when the tape cassette 10 is accommodated within the accommodating part 61 of the tape cassette adapter 60, by referring to FIGS. 7 and 8.

Regardless of whether the erroneous erasure preventing tab 43 exists or not, at a halfway point of the operation to accommodate the tape cassette 10 into the adapter 60, a corner part of the tape cassette 10 at the bottom-rear edge thereof engages with the sloping surface 115c of the detecting projection 115b. Hence, the detecting projection 115b is pushed out of the accommodating part 61. That is, when the tape cassette 10 is simply pushed downwards to be accommodated within the accommodating part 61, the erroneous erasure preventing lever 115 rotates counterclockwise against the force exerted by the coil spring 117. Moreover, the detecting projection 115b is pushed to recede within the space 62a.

In a case where the erroneous erasure preventing tab 43 of the tape cassette 10 accommodated within the adapter 60 is present, the detecting projection 115b is intercepted by the erroneous erasure preventing tab 43 and remains in the state receded within the space 62a. As indicated by two-dot chain lines in FIGS. 7 and 8, the tab 115a moves so as to move away from the depression 62b to reach the entrance part of the depression 62b. Yet, the tab 115a does not project from the rear surface of the adapter 60, to function in a similar manner as the erroneous erasure preventing tab of the standard type tape cassette. The adapter 60 in this case assumes a shape identical to that of the standard type tape cassette having the erroneous erasure preventing tab.

On the other hand, in a case where the erroneous erasure preventing tab 43 of the tape cassette 10 accommodated within the adapter 60 is removed, the detecting projection 115b is once pushed away and then enters within a depression in the tape cassette 10 formed as a result of removing of the erroneous erasure preventing tab 43. Accordingly, the erroneous erasure preventing lever 115 is rotationally returned, and the tab 115a is positioned at the innermost part of the depression 62b. Thus, the depression 62b is formed on the rear of the adapter 60, and the adapter assumes a shape identical to that of the standard type tape cassette having no erroneous erasure preventing tab, that is, with the erroneous erasure preventing tab removed.

Therefore, according to the existence and nonexistence of the erroneous erasure preventing tab 43 of the tape cassette 10 which is accommodated within the adapter 60, the adapter 60 assumes shapes identical to those of the standard type tape cassette having or not having the erroneous erasure preventing tab.

Regarding the erroneous erasure preventing lever 115, a distance dl between the pin 116 and the tab 115a is designed to be larger than a distance d2 between the pin 116 and the detecting projection 115b. Hence, the movement of the detecting projection 115b is enlarged, to move the tab 115a. Therefore, even when the variation in the shape of the tape cassette 10 due to the existence or non-existence of the erroneous erasure preventing tab is small, a movement of the tab 115a between the entrance part of the depression 62b and the innermost part of the depression 62b is large enough. In addition, a movement of the lever 115 is restricted between a position where a stopper step part 115e at one side of the lever 115 makes contact with the wall surface 69 and a position where a stopper step part 115f at the other side of the lever 115 makes contact with the wall surface of the depression 62b.

As shown in FIG. 12, the tape cassette adapter 60 accommodating the tape cassette 10 is loaded into a standard type recording and/or reproducing apparatus 120, similarly as in the case where the standard type tape cassette is loaded.

That is, by loading the tape cassette adapter 60, a supply reel driving shaft 121 is inserted into a reel driving shaft inserting part 25a of the supply reel 21 of the tape cassette 10. On the other hand, a take-up reel driving shaft 122 is inserted into the reel driving shaft inserting part 66c of the gear structure 66 within the tape cassette adapter 60. In addition, loading poles 123 and 124 and a capstan 125 respectively enter into the cutouts 90, 91, and 92 behind the tape path 12B so as to oppose the inner side of the tape path 12B.

Upon a tape loading operation, the above loading poles 123 and 124 respectively intercept and engage with the magnetic tape 12, then draw the magnetic tape 12 out of the cassette as the loading poles 123 and 124 move away from the cutouts 90 and 91, and reach positions indicated by solid lines in FIG.12. Accordingly, the magnetic tape 12 which is drawn outside the tape cassette adapter 60, makes contact with a full-width erasing head 126, and makes contact with a guide drum 127 provided with rotary video heads throughout a predetermined angular range. The magnetic tape 12 further makes contact with an audio and control head 128. Therefore, the above magnetic tape 12 is loaded onto a predetermined tape travelling path.

During recording and reproduction, the magnetic tape 12 is driven in a state pinched between the capstan 125 and a pinch roller 129. Moreover, the gear structure 66 within the tape cassette adapter 60 is rotated clockwise by the take-up reel driving shaft 122. This rotation of the gear structure 66 is transmitted to the take-up reel 22 through the intermediate gear 80, to drive the magnetic tape 12 towards a tape take-up direction. Accordingly, the magnetic tape 12 fed out by the capstan 125 is taken-up by the take-up reel 22. The magnetic tape 12 is guided by the guide pole 94 within the tape cassette adapter 60.

Figure 13:
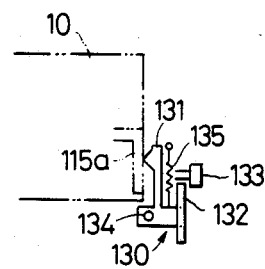
FIG. 13 is a side view showing a detection mechanism for detecting the existence or non-existence of an erroneous erasure preventing tab shown in FIG. 12.

As shown in FIG. 13, the standard type recording and/or reproducing apparatus 120 is provided with a detection mechanism 130 for detecting the existence and non-existence of the erroneous erasure preventing tab. This detection mechanism 130 is of a known construction, and consists of a detection lever 131 and an inter-locking cam 132 which shifts in response to the rotation of the above detection lever 131. When the inter-locking cam 132 is at an original position, a recording button 133 cannot be operated. The detection lever 131 is axially supported by a shaft 134, and is urged to rotate counterclockwise in FIG. 13 by the action of a spring 135. The detection lever 131 is provided at a position opposing the erroneous erasure preventing tab of the standard type tape cassette.

In a case where the standard type recording and/or reproducing apparatus 120 is loaded with the adapter 60 accommodating the tape cassette 10 which has the erroneous erasure preventing tab 43, the detection lever 131 is pushed and rotated by the tab 115a. Hence, the inter-locking cam 132 is shifted, the detection mechanism 130 is in the state shown in FIGS. 12 and 13, and the recording button 133 is released to an operational state. Accordingly, the apparatus 120 may be put into a reproducing mode or a recording mode. Thus, it becomes possible to perform recording with respect to the tape cassette 10 by use of the standard type recording and/or reproducing apparatus.

On the other hand, in a case where the standard type recording and/or reproducing apparatus 120 is loaded with the adapter 60 accommodating the tape cassette 10 having no erroneous erasure preventing tab 43, that is, with the tab 43 eliminated, the detection lever 131 enters within the depression 62b. Thus, the inter-locking cam 132 does not shift, and the recording button 133 cannot be operated in this state. Accordingly, it becomes only posible to put the apparatus 120 into a reproducing mode, and the recording contents on the magnetic tape 12 is prevented from being erroneously erased.

The tape cassette 10 is removed from the accommodating part 61 by opening the adapter 60 which is withdrawn from the apparatus 120. In the case where the erroneous erasure preventing tab 43 of the tape cassette 10 is eliminated, as the detecting projection 115b is within the depression in the rear of the tape cassette 10, it is not easy to take the tape cassette 10 out of the adapter 60. However, when the operator places his finger tip on the vertex part 115d and pulls this part, the lever 115 rotates counterclockwise. Therefore, the detecting projection 115b comes out from the above depression, and the tape cassette 10 can then be smoothly removed from the accommodating part 61.

Next, description will be given with respect to a case where the tape cassette 10 loaded into a compact type recording and/or reproducing apparatus, by referring to FIG. 14.

Figure 14:
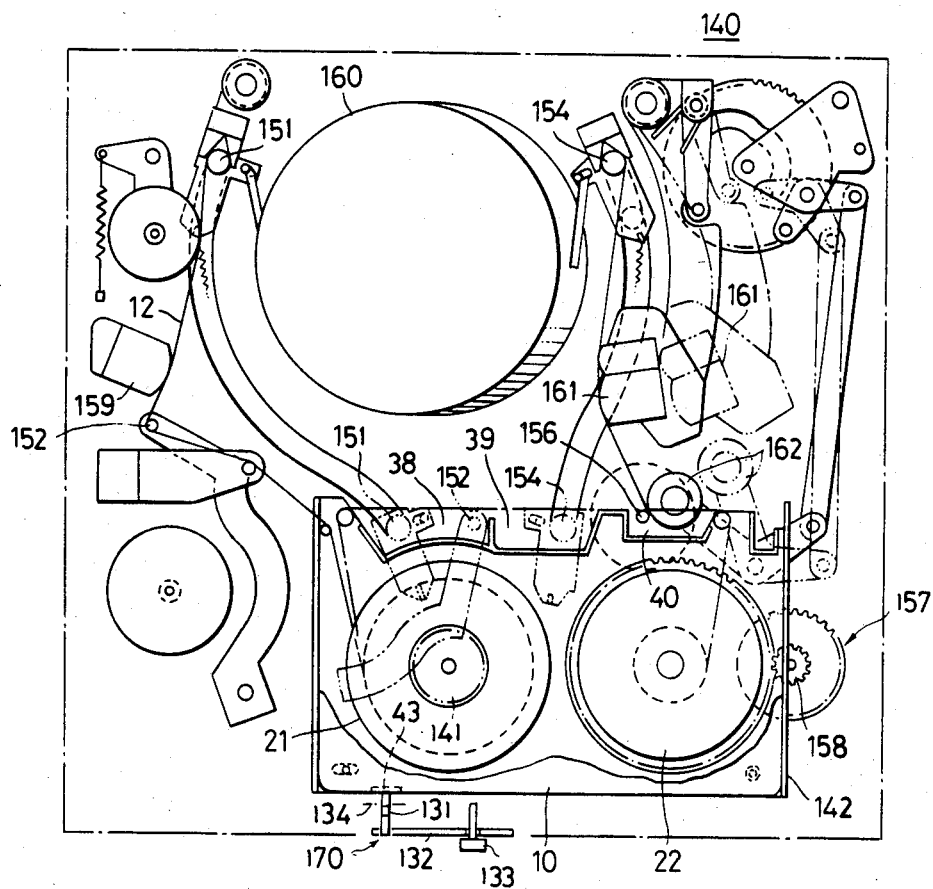
FIG. 14 is a plan view showing an example of a recording and/or reproducing apparatus designed exclusively for the miniature type tape cassette during a recording or reproducing mode, into which the miniature type tape cassette shown in FIG. 1 is loaded.

FIG. 14 shows a compact type recording and/or reproducing apparatus 140. This compact type recording and/or reproducing apparatus 140 is of a smaller size, that is, the width and depth of the compact type recording and/or reproducing apparatus 140 are smaller than those of the standard type recording and-/or reproducing apparatus 120.

A supply reel driving shaft 141 is provided at a cassette loading part of the above compact type recording and/or reproducing apparatus 140, however, a take-up reel driving shaft is not provided. The tape cassette 10 is inserted within a cassette housing 142 having a pop-up mechanism, by inserting the tape cassette 10 with the lid 13 facing forward into a predetermined position. The tape cassette 10 is thus loaded into the cassette loading part as being lowered together with the cassette housing 142.

During the loading of the above tape cassette 10, a loading pole 151 and a tension pole 152 relatively enter within the cutout 38, while a loading pole 154 and a capstan 156 respectively and relatively enter into the cutouts 39 and 40. Furthermore, the lid 13 makes contact with a lid opening projection (not shown) provided on the apparatus, and is pushed open as the tape cassette 10 is lowered. In addition, a gear 158 which constitutes a rotation transmitting mechanism 157 on the recording and/or reproducing apparatus, meshes with the teeth on the periphery of the lower flange of the take-up reel 22.

When the operational mode of the recording and/or reproducing apparatus 140 is set to a play mode, the above poles 151, 152, and 154 intercept and engage with the magnetic tape 12 to draw out the magnetic tape 12, and respectively move to positions indicated by solid lines in FIG. 14. Hence, the magnetic tape 12 is drawn out of the tape cassette 10, to make contact with a full-width erasing head 159. The magnetic tape 12 further makes contact with a guide drum 160, which is provided with rotary video heads, throughout a predetermined angular range, and also makes contact with an audio and control head 161. Thus, the magnetic tape 12 is loaded onto a predetermined tape travelling path. During recording and reproduction, the magnetic tape 12 is driven in a state pinched between the capstan 156 and a pinch roller 162. Moreover, the gear 158 which is rotated by a reel driving motor (not shown) meshes with the gear teeth 27a of the take-up reel 22, and the take-up reel 22 is accordingly driven towards a tape take-up direction.

The full-width erasing head 159, the audio control head 161, and the guide drum 160 are constructed under a substantially the same standard as the corresponding heads 126 and 128 and the guide drum 127 of the standard type recording and/or reproducing apparatus 120. Accordingly, a signal is recorded onto and reproduced from the magnetic tape 12 with a tape pattern and format identical to those of the standard type recording and/or reproducing apparatus.

In addition, a detection mechanism 170 for detecting the existence or non-existence of the erroneous erasure preventing tab, is provided in the above apparatus 140. This detection mechanism 170 is of the same construction as the above described detection mechanism 130, and those parts which are the same as those corresponding parts of the detection mechanism 130 are designated by the same reference numerals, and their description will be omitted. The detection mechanism 170 assumes a different state according to the existence and non-existence of the erroneous erasure preventing tab 43 of the tape cassette 10. The apparatus 140 cannot be put into a recording mode when the apparatus 140 is loaded with the tape cassette 10 having no tab 43, that is, with the tab 43 removed.

Figure 15:
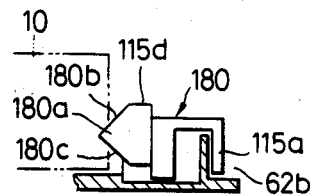
FIG. 15 is a side view showing the tip end side of another embodiment of an erroneous erasure preventing lever which constitutes an essential part of the present invention.

Next, description will be given with respect to another embodiment of an erroneous erasure preventing lever which constitutes an essential part of the present invention, by referring to FIGS. 15 through 17. In each of the FIGS. 15 through 17, those parts which are the same as those corresponding parts in FIGS. 7 and 8 are designated by the same reference numerals, and their description will be omitted.

An erroneous erasure preventing lever 180 is the same as the above described lever 115 except for a detecting projection 180a. The detecting projection 180a is of a crest shape having sloping surfaces 180b and 180c at the upper and lower sides thereof. Hence, when removing the tape cassette 10 from the accommodating part 61 wherein the tab 43 is removed and the detecting projection 180a is within the depression of the tape cassette 10, the detecting projection 180a can easily slip out of the above depression due to the action of the sloping surface 180c. Thus, the tape cassette 10 can be smoothly removed from the accommodating part 61 without requiring an extra manipulation of the lever 180.

Figure 16:
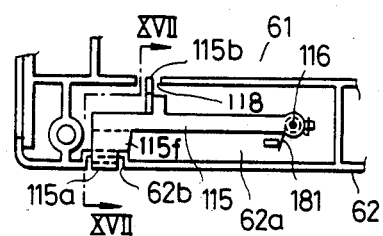
FIG. 16 is a plan view showing another embodiment of an erroneous erasure preventing lever mechanism part.
Figure 17:
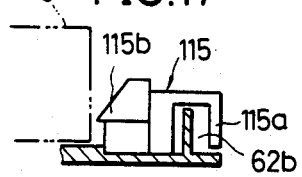
FIG. 17 is a cross section taken along a line XVII—XVII in FIG. 16.

In FIGS. 16 and 17, the erroneous erasure preventing lever 115 is urged in the opposite direction from the above described case, that is, towards the counterclockwise direction, by the force exerted by a spring 181. Accordingly, the lever 115 is normally in a state where the stopper step part 115f makes contact with the wall surface of the depression 62b. In this state, the tab 115a is positioned at the entrance part of the depression 62b, and the detecting projection 115b is receded from the accommodating part 61. Furthermore, the spring force exerted by the above spring 181 is designed considerably small compared to the spring force exerted by the spring 135 of the detection mechanism 130.

Therefore, the tape cassette 10 can be accommodated within the accommodating part 61 and removed from the accommodating part 61 in a smooth manner, without being interfered by the detecting projection 115b. Moreover, the tab 115a is pushed by the detection lever 131 when the adapter 60 is loaded into the apparatus 120. In a case where the tape cassette 10 having the erroneous erasure preventing tab is accommodated within the accommodating part 61, the detecting projection 115b makes contact with the tab 43, and the lever 115 remains at the original position and does not rotate. In addition, the detection mechanism 130 is put into the state shown in FIG. 13, and the recording button 133 can be operated. On the other hand, in a case where the tape cassette 10 having no erroneous erasure preventing tab, that is, with the tab removed, is accommodated within the accommodating part 61, the lever 115 rotates clockwise against the force exerted by the spring 181. Moreover, the detecting projection 115b enters within the depression at the rear of the tape cassette 10, and the tab 115a moves to a position at the innermost part of the depression 62b. Therefore, in this state, the detecting part of the detection lever 131 is within the depression 62b, and the operation of the recording button 133 is restricted.

Further, the present invention is not limited to these embodiments, but various variations and modifications may be made without departing from the scope of the present invention.

What is claimed is:

1. An adapter for a miniature type video tape cassette having an external form and size which is smaller than the form and size of a standard type video tape cassette, said miniature type tape cassette being used with a recording and/or reproducing apparatus of a type which is different from a standard type of recording and/or reproducing apparatus which is primarily designed for performing recording and/or reproduction when loaded with said standard type tape cassette, and said miniature cassette having an erroneous erasure preventing tab which operates together with a detection mechanism of said recording and/or reproducing apparatus of the different type, said standard type recording and/or reproducing apparatus having a detection mechanism which operates together with an erroneous erasure preventing tab of said standard type tape cassette, said adapted comprising:

an adapter case with a top and a bottom, said adapter case having an external form and size substantially the same as the form and size of said standard type tape cassette;

an accommodating part for vertically accommodating said miniature type tape cassette which vertically enters at the top, passing into said accommodating part with movement toward the bottom of said adapter case;

tape guide means for guiding a magnetic tape drawn out of said miniature type tape cassette which is accommodated in said accommodating part and for forming a tape path within said adapter;

an erroneous erasure preventing means located within said adapter case and an urging means for urging said erroneous erasure preventing means in a direction for detecting and mechanically representing the existence and non-existence of the erroneous erasure preventing tab of the miniature type tape cassette accommodated within said accommodating part, said erroneous erasure preventing means comprising a single swing lever pivoted at one end thereof, said swing lever unitarily having a detecting part and a tab part and being urged by said urging means to press said detecting part so that said detecting part detects the existence and non-existence of the erroneous erasure preventing tab of the miniature type tape cassette accommodated within said accommodating part;

said tab part projecting from one side of said swing lever and cooperating with the detecting mechanism of said standard type recording and/or reproducing apparatus;

said detecting part having a sloping part projecting from the other side of said swing lever and protruding into said accommodating part, said sloping part having a sloping surface which slopes downwardly toward the bottom of said adapter case so that said sloping surface is pushed by said cassette case when it vertically enters into said accommodating part, said sloping part receding from said accommodating part when said sloping surface is pushed by said cassette case; and said tab part and detecting part being located on an end of said swing lever which is opposite the pivoted end of said swing lever.

2. An adapter as claimed in claim 1 in which said urging means urges said swing lever in a direction to make contact with the erroneous erasure preventing tab of said miniature type tape cassette, said detecting part being intercepted by the erroneous erasure preventing tab when the erroneous erasure preventing tab is present and said detecting part entering within said miniature type tape cassette when the said erroneous erasure preventing tab has been removed, and said tab part moving in response to the movement of said detecting part.

3. An adapter as claimed in claim 2 in which said urging means is a spring member for urging said swing lever in a direction so that said detecting part of said swing lever makes contact with said miniature type tape cassette.

4. An adapter as claimed in claim 3 in which said accommodating part is located apart from a peripheral part of said adapter case, and said swing lever is arranged and provided in a space between said accommodating part and the peripheral part of said adapter case.

5. An adapter as claimed in claim 1 in which said accommodating part is located apart from a peripheral part of said adapter case; said swing lever is located in a space between said accommodating part and the peripheral part of said adapter case; said detecting part is capable of projecting within said accommodating part by penetrating through an opening in a wall for dividing said accommodating part and said space; and said tab part is placed in a depression in said adapter case.

6. An adapter for a miniature type tape cassette having an external form and size which is smaller than the form and size of a standard type tape cassette, said miniature type tape cassette being used with a recording and/or reproducing apparatus of a type which is different from a standard type of recording and/or reproducing apparatus which is primarily designed for performing recording and/or reproduction when loaded with said standard type tape cassette, and said minature cassette having an erroneous erasure preventing tab which operates together with a detection mechanism of said recording and/or reproducing apparatus of the different type, said standard type recording and/or reproducing apparatus having a detection mechanism which operates together with an erroneous erasure preventing tab of said standard type tape cassette, said adapter comprising:

an adapter case having an external form and size substantailly the same as the form and size of said standard type tape cassette;

an accommodating part for accommodating said miniature type tape cassette;

an erroneous erasure preventing means located within said adapter case and an urging means for urging said erroneous erasure preventing means in a direction for detecting and mechanically representing the existence and non-existence of the erroneous erasure preventing tab of the miniature type tape cassette accommodated within said accommodating part, said erroneous erasure preventing means comprising a single swing lever pivoted at one end thereof, said swing lever unitarily having a detecting part and a tab part, said tab part moving to a position where said tab part operates together with the detection mechanism of said standard type recording and/or reproducing apparatus, said movement being in response to the existence and non-existence of the erroneous erasure preventing tab of the miniature type tape cassette accommodated within said accommodating part;

said detecting part being intercepted by the erroneous erasure preventing tab when the erroneous erasure preventing tab is present, said detecting part entering within said miniature type tape cassette when the said erroneous erasure preventing tab has been removed, and said tab part moving in response to the movement of said detecting part;

said detecting part projecting from one side and said tab part projecting from the other side of said swing lever and said urging means being a spring member for urging said swing lever in a direction so that said detecting part of said swing lever makes contact with and is moved by a camming action while said miniature type tape cassette is being received by said accommodating part; and said tab part being positioned so that the distance between the tab part and the pivoted point of said swing lever is greater than the distance between said detecting part and the pivoted point of said swing lever.

7. An adapter as claimed in claim 6, in which said detecting mechanism of said standard type recording and/or reproducing apparatus comprises first urging means for urging said detecting mechanism of the standard type recording and/or reproducing apparatus toward said erroneous erasure preventing tab of said standard type tape cassette, said swing lever having a second urging means for exerting an urging force substantially smaller than an urging force of said first urging means to urge said swing lever in a direction so that said detecting part does not protrude into the accommodating part when the adapter is not loaded into said standad type recording and/or reproducing apparatus, and said detecting part carries out a detection when the adapter is loaded into said standard type recording and/or reproducing apparatus.

* * * * *

UNITED STATES PATENT AND TRADEMARK OFFICE
CERTIFICATE OF CORRECTION

PATENT NO. : 4,602,300
DATED : July 22, 1986
INVENTOR(S) : OGATA ET AL.

It is certified that error appears in the above-identified patent and that said Letters Patent is hereby corrected as shown below:

Claim 1,   Column 13, line 52, change "adapted" to read --adapter--.

Claim 6,   Column 15, line 13, change "substantailly" to read --substantially--.

Claim 6,   Column 16, line 17, after "between" change "the" to read --said--.

Claim 7,   Column 16, line 33, change "standad" to --standard--.

Signed and Sealed this

Thirteenth Day of January, 1987

Attest:

DONALD J. QUIGG

Attesting Officer   Commissioner of Patents and Trademarks